(12) United States Patent
No et al.

(10) Patent No.: US 10,079,076 B2
(45) Date of Patent: Sep. 18, 2018

(54) EMERGENCY CORE COOLING SYSTEM FOR A WATER-COOLED REACTOR SYSTEM

(71) Applicant: Korea Advanced Institute of Science and Technology, Daejeon (KR)

(72) Inventors: Hee Cheon No, Daejeon (KR); Ho Sik Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 764 days.

(21) Appl. No.: 14/536,047

(22) Filed: Nov. 7, 2014

(65) Prior Publication Data

US 2015/0131770 A1   May 14, 2015

(30) Foreign Application Priority Data

Nov. 8, 2013 (KR) .......................... 10-2013-0135327

(51) Int. Cl.
*G21C 15/18* (2006.01)
*G21C 9/008* (2006.01)

(52) U.S. Cl.
CPC .............. *G21C 15/18* (2013.01); *G21C 9/008* (2013.01); *Y02E 30/40* (2013.01)

(58) Field of Classification Search
CPC ......... G21C 15/18; G21C 9/008; G21C 9/004
USPC ........................................ 376/282, 283, 299
See application file for complete search history.

(56) References Cited

U.S. PATENT DOCUMENTS

| 4,170,517 A * | 10/1979 | Meuschke | G21C 13/028 376/205 |
| 5,082,619 A * | 1/1992 | Sawyer | G21C 15/18 376/283 |
| 5,319,687 A * | 6/1994 | Henry | G21C 15/18 376/299 |
| 2007/0092053 A1 * | 4/2007 | Sato | G21C 9/004 376/283 |

(Continued)

FOREIGN PATENT DOCUMENTS

| JP | 06222182 A | 8/1994 |
| KR | 100813939 | 3/2008 |

(Continued)

OTHER PUBLICATIONS

MDEP Design Specific Common Position, "Common Position on the Design and Use of Explosive—Actuated (Squib) Valves in Nuclear Power Plants", AP1000 Design Specific Working Group, Dec. 2010. (Year: 2010).*

(Continued)

*Primary Examiner* — Jack W Keith
*Assistant Examiner* — Daniel Wasil
(74) *Attorney, Agent, or Firm* — Caesar Rivise, PC

(57) ABSTRACT

An emergency core cooling system removes decay heat generated by a reactor core of a reactor system. A reactor vessel uses water as a coolant. A containment structure surrounds the reactor system. A reactor cavity surrounds the reactor vessel. A first cavity pipe extends into the reactor vessel and provides a recirculation loop of cooling water by discharging vapor generated in the reactor vessel and supplying condensed water collected in the reactor cavity in an opposite direction.

10 Claims, 4 Drawing Sheets

(56) References Cited

U.S. PATENT DOCUMENTS

2013/0051511 A1* 2/2013 Watson ............... G21C 15/18
376/273
2014/0205051 A1* 7/2014 Harkness ............. G21C 15/18
376/282

FOREIGN PATENT DOCUMENTS

KR 101242746 3/2013
WO WO 2013/028408 2/2013

OTHER PUBLICATIONS

Hannink, "Investigation of the Use of Nanofluids to Enhance the In-Vessel Retention Capabilities of Advanced Light Water Reactors", Massachusetts Institute of Technology 2007. (Year: 2007).*
Freis, "AP1000TM Nuclear Power Plant Passive Safety System Actuation Using Explosively Opening Squib Valves", IAEA-CN-164-3P10, pp. 1-6, 2009. (Year: 2009).*
Stosic, "Boiling water reactor with innovative safety concept: The Generation III+ SWR-1000", Nuclear Engineering and Design 238, No. 8 (2008): 1863-1901. (Year: 2008).*
Guozhi, "A study using Relaps on capability and instability of two-phase natural circulation flow under passive external reactor vessel cooling", Annals of Nuclear Energy 60 (2013): 115-126. (Year: 2013).*
Chang, "Design of integrated passive safety system (IPSS) for ultimate passive safety of nuclear power plants", Nuclear Engineering and Design 260 (2013): 104-120. (Year: 2013).*
Kim, "The Design Characteristics of the Advanced Power Reactor 1400", ICONE-13, IAEA-CN-164-3S09 (2005). (Year: 2005).*

* cited by examiner

EMERGENCY CORE COOLING SYSTEM FOR A WATER-COOLED REACTOR SYSTEM

CROSS-REFERENCES TO RELATED APPLICATIONS

This patent application claims the benefit of priority under 35 U.S.C. § 119(b) from Korean Patent Application No. 10-2013-0135327 filed Nov. 8, 2013, the contents of which are incorporated herein by reference.

BACKGROUND OF THE INVENTION

1. Field of the Invention

The present disclosure relates to an emergency core cooling system and an emergency core cooling method for a water-cooled reactor system, and more particularly, to an emergency core cooling system and an emergency core cooling method for a fail-safe water-cooled reactor, which completely removes decay heat generated from a core in safety while an active component such as a pump is not used.

2. Description of the Related Art

Doubts of the general public about safety of a nuclear power plant have been significantly increased due to the nuclear accident occurring in Fukushima, Japan, on Mar. 11, 2011, and thus various countermeasures improving safety of an existing nuclear power plant have been provided.

Meanwhile, most nuclear reactors of nuclear power plants throughout the world as well as the nuclear reactor of the nuclear accident occurring in Japan are water-cooled reactors. In the water-cooled reactor, water is used as a coolant of a core, and examples thereof include a pressurized water reactor, a pressurized heavy water reactor, and a boiling water reactor.

The most important object to be solved in order to increase safety of the water-cooled reactor is to effectively remove decay heat continuously generated even after the nuclear reactor is shut down due to radioactive decay of nuclear fission products when the nuclear reactor is shut down.

To this end, in the water-cooled reactor, an emergency core cooling system (ECCS) for removing decay heat after the nuclear reactor is shut down is provided to cope with the case where a loss of coolant accident (LOCA) occurs or water is not supplied through a main feedwater system or an auxiliary feedwater system due to an accident.

An emergency core cooling system of a commercial nuclear power plant is generally constituted by a safety injection tank, a safety injection system, and a recirculation system. The safety injection tank passively supplies water stored in a compression tank into a reactor vessel by using a pressure difference when the loss of coolant accident occurs. In addition, the safety injection system actively supplies cooling water from an in-containment refueling water storage tank into the reactor vessel by using an active component such as a pump. In addition, when water of the in-containment refueling water storage tank is used up, the recirculation system supplies back cooling water collected in a recirculation sump provided on the bottom of a containment into the reactor vessel by using the pump.

As described above, since the emergency core cooling system of the commercial nuclear power plant has a limited cooling water volume of the safety injection tank, an active system using the pump as well as a passive system is necessarily required to cool a core over a long period of time. However, when a nuclear accident accompanied by a station blackout (SBO) where electric power supply is cut off over a long period of time occurs, the active system of the emergency core cooling system cannot be used, accordingly, the core cannot be cooled over a long period of time.

Therefore, in the case where emergency core cooling is required, a passive emergency core cooling system needs to be developed, which can completely remove decay heat generated from the core in safety while the active component such as the pump is not used and the core is not exposed.

See Korean Patent No. 813,939 and Korean Patent No. 1,242,746 for related art documents.

SUMMARY OF THE INVENTION

Embodiments of the present invention are directed to provide an emergency core cooling system and an emergency core cooling method for a fail-safe water-cooled reactor system, which completely remove decay heat generated from a core in safety only by a passive method not using an active component.

According to an aspect of the present invention, there is provided an emergency core cooling system for a fail-safe water-cooled reactor system, including a reactor vessel using water as a coolant and a moderator, and receiving therein a reactor core on which nuclear fission occurs; a containment surrounding the entire reactor system including the reactor vessel and condensing a vapor discharged from the reactor vessel when emergency core cooling is performed; a reactor cavity which surrounds the reactor vessel and in which water condensed in the containment is collected due to gravity; a first cavity pipe provided to pass through the reactor vessel; and a cavity valve provided on the cavity pipe to open the first cavity pipe when emergency core cooling is performed and thus discharge the vapor generated from the reactor vessel to an outside.

In the emergency core cooling system according to the present invention, it is preferable that the containment be formed of steel to condense the vapor discharged from the reactor vessel on a surface of an inner wall.

Also, a heat exchanger may be provided in the containment to condense the vapor discharged from the reactor vessel on the heat exchanger.

Also, it is preferable that the cavity valve is operated by an alternating current (AC) power supply, or is operated by a direct current (DC) power supply such as a battery when the AC power supply is unable to be used.

Also, it is preferable that the first cavity pipe be disposed in an upper portion of the reactor vessel. In this case, the first cavity pipe may be provided in plurality and the plurality of first cavity pipes may be placed at the same height.

Also, the emergency core cooling system according to the present invention may further include a second cavity pipe provided to pass through the reactor vessel to be placed at the same height as the first cavity pipe; and a rupture disk provided in the second cavity pipe and ruptured due to an increase in internal pressure of the reactor vessel when the cavity valve is not operated during emergency core cooling to thereby open the second cavity pipe.

According to another aspect of the present invention, there is provided an emergency core cooling method for a fail-safe water-cooled reactor system, including opening a cavity valve of a first cavity pipe provided to pass through a reactor vessel, by operating an emergency core cooling system when an accident requiring emergency core cooling occurs in the water-cooled reactor system (S100); discharging a vapor generated from a core due to decay heat through the opened first cavity pipe to an outside of the reactor vessel (S200); condensing the discharged vapor in a containment (S300); allowing water condensed in the containment to flow down due to gravity and thus to be collected in a reactor cavity surrounding the reactor vessel (S400); allowing cooling water collected in the reactor cavity to flow into the reactor vessel through the first cavity pipe due to gravity (S500); and removing decay heat by cooling water flowing into the reactor vessel (S600).

In the emergency core cooling method according to the present invention, it is preferable that the cavity valve be operated by an alternating current (AC) power supply or operated by a direct current (DC) power supply such as a battery when a station blackout occurs.

Also, the opening of the cavity valve of the first cavity pipe (S100) further includes opening the second cavity pipe provided through the reactor vessel when the cavity valve is not opened (S150).

Also, the removing of decay heat in the reactor vessel (S600) is performed by allowing the vapor generated due to decay heat and cooling water of the reactor cavity to flow in opposite directions through the opened first cavity pipe or an opened second cavity pipe, respectively and thus perform recirculation of cooling water.

As described above, an emergency core cooling system and an emergency core cooling method for a fail-safe water-cooled reactor system according to preferred embodiments of the present invention have an effect of removing decay heat generated from a core while an active component such as a pump is not used, that is, only by a passive method, unlike an existing emergency core cooling system. Therefore, even though an accident accompanied by a station blackout occurs to require emergency core cooling, it is possible to completely remove decay heat in safety while the core is not exposed.

Other objects, specific advantages, and novel features of the present invention will be more clearly understood by the accompanying drawings, the following detailed description, and preferred embodiments.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
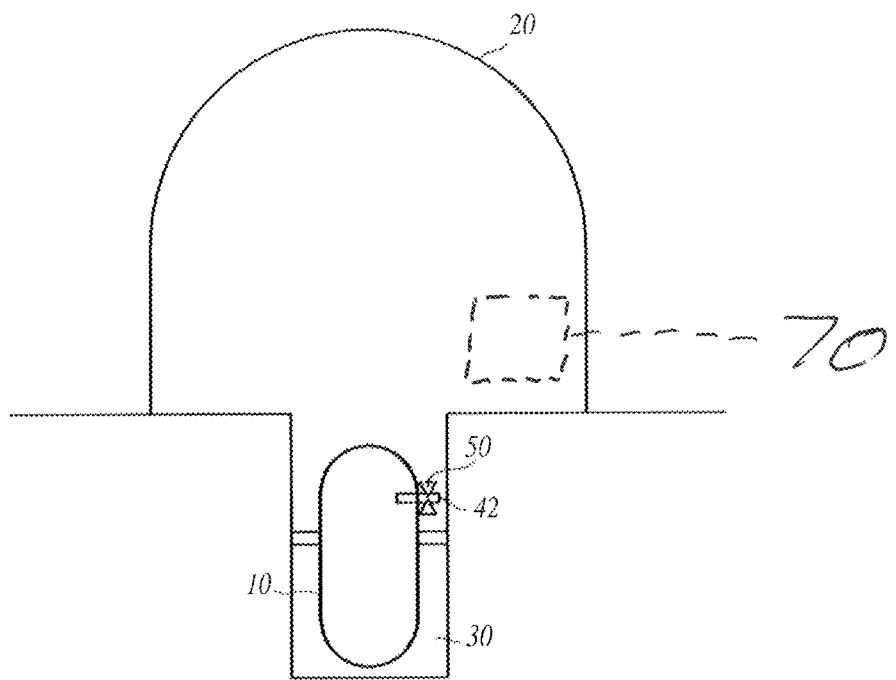
FIG. 1 is a schematic diagram illustrating an emergency core cooling system for a fail-safe water-cooled reactor system according to an embodiment of the present invention.

The present invention will be described more fully hereinafter with reference to the accompanying drawings, in which the most preferred embodiment of the present invention is shown so as to be easily understood by the person with ordinary skill in the art to which the present invention belongs.

Also, it should be understood that detailed descriptions of well-known functions and structures related to the present invention will be omitted so as not to unnecessarily obscure the important point of the present invention. In addition, for addition of reference numerals, the same elements will be designated by the same reference numerals even though the reference numerals are shown in different drawings.

Emergency Core Cooling System for Fail-Safe Water-Cooled Reactor System

FIG. 1 is a schematic diagram illustrating an emergency core cooling system for a fail-safe water-cooled reactor system according to an embodiment of the present invention. The emergency core cooling system according to the present invention can be applied to all water-cooled reactor systems such as a boiling water reactor and a pressurized water reactor, in which water is used as a coolant and a moderator and nuclear fission occurs.

The emergency core cooling system according to the embodiment of the present invention includes, as illustrated in FIG. 1, a reactor vessel 10, a containment 20, a reactor cavity 30, a first cavity pipe 42, and a cavity valve 50.

The reactor vessel 10 receives a reactor core (not illustrated) therein.

As illustrated in FIG. 1, the containment 20 is a spherical or bell-shaped structure surrounding the entire reactor system including the reactor vessel 10 and the reactor cavity 30. The containment is sealed and pressure-resistant to prevent radioactive materials from being discharged to the outside when an accident such as breakage of the reactor vessel 10 occurs.

Further, when an accident requiring emergency core cooling occurs in the emergency core cooling system according to the present invention, the containment 20 functions to condense a vapor discharged from the reactor vessel 10. To this end, according to the present embodiment, the containment 20 made of steel having high thermal conductivity is used instead of the containment made of concrete having low thermal conductivity unlike an existing nuclear power plant. Accordingly, decay heat generated from the core may be effectively discharged to the outside of the power plant by condensing the vapor discharged from the reactor vessel 10 during emergency core cooling on a surface of an inner wall of the steel containment 20.

Meanwhile, according to another embodiment of the present invention, when the existing containment made of concrete is used, a separate heat exchanger 70 can be provided in the containment 20 to condense the vapor discharged from the reactor vessel 10 on the heat exchanger.

As illustrated in FIG. 1, the reactor cavity 30 is formed to be spaced a predetermined distance apart from an outer circumference of the reactor vessel 10 and surround the reactor vessel, and water condensed on the containment 20 is collected therein. That is, water condensed on the containment 20 positioned over the reactor cavity 30 is passively collected in the reactor cavity 30 due to gravity, and thus a level of cooling water collected in the reactor cavity 30 ascends.

The first cavity pipe 42 is a pipe providing a path connecting the inside and the outside of the reactor vessel 10. According to the present embodiment, as illustrated in FIG. 1, the first cavity pipe 42 is provided to pass through an upper portion of the reactor vessel 10. In this case, the first cavity pipe 42 is provided at a position that is lower than an upper end of the reactor cavity 30. Through the first cavity pipe 42, the vapor generated in the reactor vessel 10 may be discharged to the outside of the reactor vessel 10 during emergency core cooling.

Furthermore, as described above, when a level of cooling water collected in the reactor cavity 30 is positioned to be higher than the first cavity pipe 42, cooling water may flow into the reactor vessel 10 due to gravity. In this case, in the first cavity pipe 42, the vapor generated in the reactor vessel 10 and cooling water collected in the reactor cavity 30 flow in opposite directions, respectively. Accordingly, a recirculation loop of cooling water of the emergency core cooling system according to the present invention is formed.

As illustrated in FIG. 1, the cavity valve 50 is provided in the first cavity pipe 42 to open and close the first cavity pipe 42.

The cavity valve 50 is closed during a normal operation to close the first cavity pipe 42, and receives an opening control signal from a control system (not illustrated) to open the first cavity pipe 42 when the emergency core cooling system of the present invention is operated.

In addition, it is preferable that the cavity valve 50 be operated by an alternating current (AC) power supply when a normal operation is performed or an accident other than a station blackout (SBO) occurs and by a direct current (DC) power supply such as a battery in case of emergency such as the station blackout, in which the alternating current power supply cannot be used. Accordingly, it is possible to solve a problem in that emergency core cooling is not performed because of the cavity valve 50 being not operated when the station blackout accident occurs.

Figure 4:
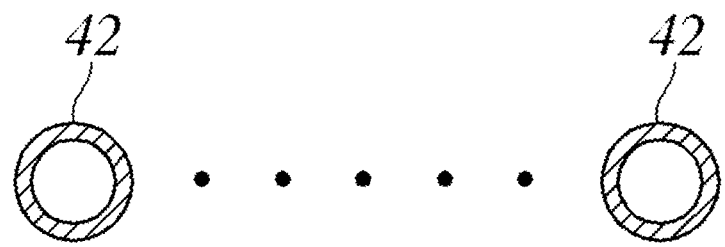
FIG. 4 is a schematic diagram of multiple first cavity pipes.

Meanwhile, FIG. 1 illustrates only one first cavity pipe 42 having the cavity valve 50, but according to the present embodiment, the two or more first cavity pipes 42 may be provided to be placed at the same height along a circumference of reactor vessel 10. According to this, the vapor and cooling water may be flow through a plurality of first cavity pipes 42 (see FIG. 4) to further improve efficiency of emergency core cooling. Further, even though one first cavity pipe 42 is not opened due to the reason such as failure in cavity valve 50, emergency core cooling may be performed through another first cavity pipe 42, and thus safety of the emergency core cooling system may be further secured.

Figure 2:
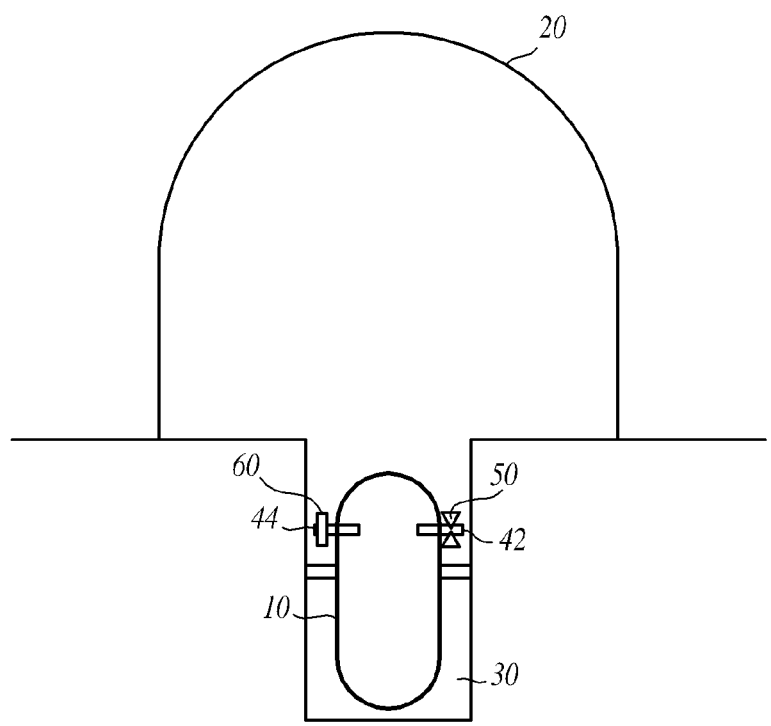
FIG. 2 is a schematic diagram illustrating an emergency core cooling system for a fail-safe water-cooled reactor system according to another embodiment of the present invention.

FIG. 2 is a schematic diagram illustrating an emergency core cooling system for a fail-safe water-cooled reactor system according to another embodiment of the present invention.

As illustrated in FIG. 2, the emergency core cooling system according to another embodiment of the present invention further includes a second cavity pipe 44 and a rupture disk 60. Since other elements are the same as the aforementioned descriptions, repeated description will be omitted herein.

As illustrated in FIG. 2, the second cavity pipe 44 is provided to pass through the upper portion of the reactor vessel 10 to be placed at the same height as the first cavity pipe 42.

The rupture disk 60 acts as an emergency valve to cope with the case of occurrence of an accident that the aforementioned cavity valve 50 of the first cavity pipe 42 is not opened due to failure. The rupture disk 60 is provided in the second cavity pipe 44 to be ruptured when a predetermined pressure or more is applied.

The rupture disk 60 closes the second cavity pipe 44 during the normal operation or when the cavity valve 50 is opened during emergency core cooling. In addition, in the case where the cavity valve 50 is not opened when an accident requiring emergency core cooling occurs, if an internal pressure of the reactor vessel 10 is increased to reach a predetermined value or more, the rupture disk 60 is ruptured to open the second cavity pipe 44 and thus perform emergency core cooling.

As described above, the emergency core cooling system according to the present invention may further include the second cavity pipe 44 and the rupture disk 60 to prevent in advance an accident that emergency core cooling is not performed due to failure in cavity valve 50 or parts driving the cavity valve 50 when the accident requiring emergency core cooling occurs.

Emergency Core Cooling Method for Fail-safe Water-cooled Reactor System

Hereinafter, an emergency core cooling method for a fail-safe water-cooled reactor system will be described with reference to FIGS. 1 to 3.

Figure 3:
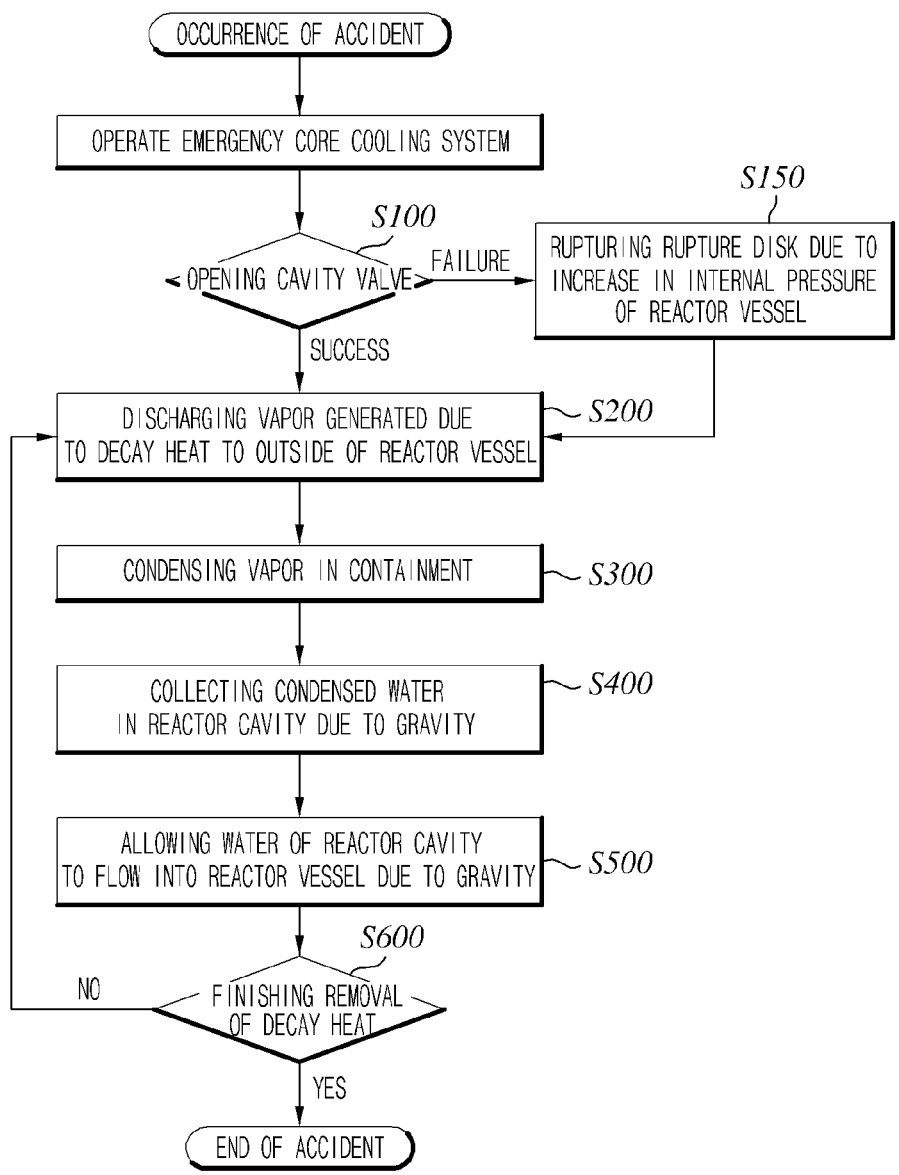
FIG. 3 is a flowchart showing an emergency core cooling method for a fail-safe water-cooled reactor system according to a preferred embodiment of the present invention.

FIG. 3 is a flow chart showing an emergency core cooling method for a fail-safe water-cooled reactor system according to a preferred embodiment of the present invention. In the emergency core cooling method according to the present invention, first, when an accident requiring emergency core cooling, such as a loss of coolant accident (LOCA) or an accident that water is not supplied through a main feedwater system or an auxiliary feedwater system, occurs, an emergency core cooling system is operated, and thus a control system (not illustrated) transmits a signal for opening the cavity valve 50 to open the cavity valve 50 of the first cavity pipe 42 provided to pass through the reactor vessel 10 (S100).

In this case, when a plurality of first cavity pipes 42 and cavity valves 50 are provided in the reactor vessel 10, depending on conditions all of the cavity valves 50 are opened or a part of the cavity valves 50 is selectively opened.

In addition, the control system (not illustrated) may sense the accident requiring emergency core cooling by using a sensor to automatically transmit a control signal for opening the cavity valve 50. Further, a manager can directly operate generation of the control signal.

In addition, the cavity valve 50 may be operated by an alternating current (AC) power supply when an accident other than a station blackout (SBO) occurs or operated by a direct current (DC) power supply such as a battery in the case of occurrence of the station blackout accident that the alternating current power supply cannot be used.

Meanwhile, in the aforementioned step (S100), when an accident that the cavity valve 50 is not opened occurs, the rupture disk 60 of the second cavity pipe 44 provided to pass through the reactor vessel 10 is ruptured due to an increase in an internal pressure of the reactor vessel 10 to open the second cavity pipe 44 (S150). That is, the present invention may prevent in advance an accident that emergency core cooling is not performed due to failure in cavity valve 50 or parts driving the cavity valve 50 by using the second cavity pipe 44 and the rupture disk 60. That is, the second cavity pipe 44 may act as a substitute for the role of the first cavity pipe.

Next, when the cavity valve 50 is opened, the vapor generated due to decay heat in the reactor vessel 10 is discharged through the first cavity pipe 42 to the outside (S200). In this case, when an accident that the cavity valve 50 is not opened occurs, as described above, the vapor is discharged through the second cavity pipe 44 to the outside.

Next, the vapor discharged through the first cavity pipe 42 or the second cavity pipe 44 moves through the reactor cavity 30 to the containment 20 to be heat-exchanged while being condensed (S300). At this time, when the containment is made of steel, the vapor is condensed on a surface of an inner wall of the containment 20; and when the containment is made of concrete, the vapor is condensed on a heat exchanger (not illustrated) provided in the containment.

Accordingly, in the case of the containment made of steel, decay heat generated from the core is transferred to the containment 20 during condensing of the vapor on the inner wall of the containment 20, and finally, decay heat is removed by heat-exchanging with an external environment due to radiation and convection of air. In the case of the containment made of concrete, decay heat is discharged to the outside of the containment while the vapor is condensed on the heat exchanger, and finally, decay heat is removed due to convection of water or air in a tank provided on an external wall of the containment.

Next, water condensed in the containment 20 flows down due to gravity to be collected in the reactor cavity 30 surrounding the reactor vessel 10 (S400). In this case, the vapor is continuously condensed while decay heat is removed, and condensed water is passively collected in the reactor cavity 30 to allow a water level of the reactor cavity 30 to ascend.

Next, cooling water collected in the reactor cavity 30 passively moves into the reactor vessel 10 through the first cavity pipe 42 due to gravity (S500). In this case, when the accident that the cavity valve 50 is not opened occurs, cooling water flows into the reactor vessel 10 through the second cavity pipe 44 in which the rupture disk 60 is ruptured.

Finally, cooling water of the emergency core cooling system is recirculated until decay heat generated from the core is completely removed (S600). Here, In the first cavity pipe 42 or the second cavity pipe 44, the vapor generated in the reactor vessel 10 and cooling water collected in the reactor cavity 30 flow in opposite directions, respectively. That is, a recirculation loop of cooling water of the emergency core cooling system is formed. In addition, when decay heat is completely removed, the accident is finally finished.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An emergency core cooling system for a reactor vessel using water as a coolant and a moderator, and receiving therein a reactor core on which nuclear fission occurs, the emergency core cooling system comprising:
    a containment structure surrounding the entire reactor system including the reactor vessel and condensing a vapor discharged from the reactor vessel to obtain water when emergency core cooling is performed;
    a reactor cavity that surrounds the reactor vessel and in which said water condensed in the containment structure is collected due to gravity;
    a first cavity pipe extending through the reactor vessel to an interior thereof, wherein said first cavity pipe has a first cavity pipe opening in said reactor cavity and outside of said reactor vessel that is lower than an upper end of the reactor cavity; and
    a cavity valve provided on the first cavity pipe to open the first cavity pipe when emergency core cooling is performed and thus discharge the vapor generated in the reactor vessel through the first cavity pipe opening to an exterior of the reactor vessel;
    wherein said first cavity pipe provides a recirculation loop of cooling water by discharging said vapor generated in the reactor vessel and supplying said water collected in said reactor cavity in opposite directions,
    wherein width of said reactor cavity is less than width of said containment structure, wherein upper most portion of said reactor vessel is located in the reactor cavity below upper most end of the reactor cavity, and wherein the upper most end of the reactor cavity is located below the containment structure.

2. The emergency core cooling system as set forth in claim 1, wherein the containment structure is formed of steel to condense, on a surface of an inner wall of the containment structure, the vapor discharged to the exterior of the reactor vessel from an interior of the reactor vessel.

3. The emergency core cooling system as set forth in claim 1, wherein a heat exchanger is provided in the containment structure to condense the vapor discharged from the reactor vessel on the heat exchanger.

4. The emergency core cooling system as set forth in claim 1, wherein the cavity valve is operated by an alternating current (AC) power supply, or is operated by a direct current (DC) power supply such as a battery when the AC power supply is unable to be used.

5. The emergency core cooling system as set forth in claim 1, wherein the first cavity pipe extends into the reactor vessel at an upper portion thereof.

6. The emergency core cooling system as set forth in claim 5, wherein the first cavity pipe is provided in plurality and the first cavity pipes are placed at the same height.

7. The emergency core cooling system as set forth in claim 1, further comprising:
    a second cavity pipe extending through the reactor vessel to said interior thereof to be placed at the same height as the first cavity pipe; and
    a rupture disk provided in the second cavity pipe that ruptures due to an increase in internal pressure of the reactor vessel when the cavity valve is not operated during emergency core cooling to thereby open the second cavity pipe between the interior of the reactor vessel and the exterior of the reactor vessel.

8. The emergency core cooling system of claim 1, wherein said first cavity pipe includes a plurality of pipes that allows said water after being condensed and said vapor from inside said reactor vessel to flow in opposite directions simultaneously.

9. The emergency core cooling system of claim 1, wherein said cooling system includes a path for condensation of said vapor extending from said containment structure to a location that is in said reactor cavity, outside of said reactor vessel and below said opening, wherein said reactor cavity maintains said water from said vapor after being condensed so that the water rises in said reactor cavity from below said first cavity pipe opening to enter said first cavity pipe opening.

10. The emergency core cooling system as set forth in claim 1, wherein an uppermost end of the reactor cavity opens to an upper area contained by the containment structure.

* * * * *